United States Patent
Wang

(10) Patent No.: US 10,675,500 B2
(45) Date of Patent: Jun. 9, 2020

(54) MULTI-AXIAL UNIDIRECTIONAL POWER TRANSMISSION SYSTEM

(71) Applicant: KEEN NEEK CO., LTD., Taichung (TW)

(72) Inventor: Chin-Liu Wang, Taichung (TW)

(73) Assignee: Keen Neek Co., Ltd., Taichung (TW)

( * ) Notice: Subject to any disclaimer, the term of this patent is extended or adjusted under 35 U.S.C. 154(b) by 165 days.

(21) Appl. No.: 16/028,841

(22) Filed: Jul. 6, 2018

(65) Prior Publication Data

US 2019/0217149 A1 Jul. 18, 2019

(30) Foreign Application Priority Data

Jan. 12, 2018 (TW) .............................. 107101201 A

(51) Int. Cl.
*A63B 21/00* (2006.01)
*F16H 7/08* (2006.01)
(Continued)

(52) U.S. Cl.
CPC .............. *A63B 21/154* (2013.01); *A63B 1/00* (2013.01); *A63B 21/00* (2013.01); *A63B 21/00072* (2013.01); *A63B 21/00192* (2013.01); *A63B 22/203* (2013.01); *A63B 69/18* (2013.01); *F16F 15/18* (2013.01); *F16H 7/08* (2013.01); *F16H 19/06* (2013.01); *F16H 19/0672* (2013.01); *F16H 55/36* (2013.01); *A63B 2210/50* (2013.01); *A63B 2244/19* (2013.01); *F16H 2007/088* (2013.01); *F16H 2019/0681* (2013.01); *F16H 2055/366* (2013.01)

(58) Field of Classification Search
CPC ......... A63B 21/154; A63B 21/00; A63B 1/00; A63B 22/203; A63B 21/00192; A63B 21/00072; A63B 2244/19; A63B 2210/50; A63B 21/22; A63B 22/0012; A63B 22/0025; A63B 2022/0033; A63B 2022/0035; A63B 23/00; A63B 23/035–0405; A63B 69/0022; A63B 69/18–182; A63B 23/0417–0429; F16H 7/08; F16H 55/36; F16H 19/0672; F16H 19/06; F16H 2007/088; F16H 2055/366; F16H 2019/0681; F16F 15/18
See application file for complete search history.

(56) References Cited

U.S. PATENT DOCUMENTS 4,512,571 A * 4/1985 Hermelin ........... A63B 22/0007
482/132
4,529,194 A * 7/1985 Haaheim .............. A63B 21/012
482/70

(Continued)

*Primary Examiner* — Andrew S Lo
(74) *Attorney, Agent, or Firm* — Wang Law Firm, Inc.

(57) ABSTRACT

A multi-axial unidirectional power transmission system includes a transmission unit and a resistance unit. The transmission unit includes a first main shaft and a transmission wheel provided on the first main shaft. The resistance unit includes a second main shaft and a damping wheel mounted on the second main shaft. The two transmission wheels and the damping wheel can be placed flat on the body since they are mounted on different main shafts, thereby making the whole plane of the multi-axis unidirectional power transmission system consistent, thus achieving the effects of space saving, convenient storage and convenient transportation.

10 Claims, 7 Drawing Sheets

(51) Int. Cl.
*F16H 19/06* (2006.01)
*A63B 69/18* (2006.01)
*A63B 22/20* (2006.01)
*F16H 55/36* (2006.01)
*F16F 15/18* (2006.01)
*A63B 1/00* (2006.01)

(56) References Cited

U.S. PATENT DOCUMENTS

| | | | | |
|---|---|---|---|---|
| 4,618,139 A * | 10/1986 | Haaheim | A63B 22/203 | 482/115 |
| 4,659,077 A * | 4/1987 | Stropkay | A63B 21/018 | 482/120 |
| 4,679,786 A * | 7/1987 | Rodgers | A63B 21/154 | 482/70 |
| 4,867,443 A * | 9/1989 | Jensen | A63B 22/001 | 482/70 |
| 4,960,276 A * | 10/1990 | Feuer | A63B 21/157 | 482/4 |
| 5,108,093 A * | 4/1992 | Watterson | A63B 22/0012 | 482/112 |
| 5,192,257 A * | 3/1993 | Panasewicz | A63B 21/154 | 482/134 |
| 5,230,677 A * | 7/1993 | Chi | A63B 21/154 | 434/253 |
| 5,279,531 A * | 1/1994 | Jen-Huey | A63B 23/0417 | 482/51 |
| 5,368,533 A * | 11/1994 | Feuer | A63B 21/154 | 482/134 |
| 5,433,683 A * | 7/1995 | Stevens | A63B 22/203 | 482/70 |
| 5,941,800 A * | 8/1999 | Laconis | A63B 69/18 | 482/51 |
| 5,989,163 A * | 11/1999 | Rodgers, Jr. | A63B 22/0664 | 482/110 |
| 6,302,829 B1 * | 10/2001 | Schmidt | A63B 21/0058 | 482/51 |
| 6,626,802 B1 * | 9/2003 | Rodgers, Jr. | A63B 21/00181 | 482/110 |
| 6,855,093 B2 * | 2/2005 | Anderson | A63B 22/205 | 482/51 |
| 6,893,382 B1 * | 5/2005 | Moon | A63B 21/154 | 482/51 |
| 6,923,745 B2 * | 8/2005 | Stearns | A63B 22/203 | 482/52 |
| 2004/0204293 A1 * | 10/2004 | Andreasen | A63B 21/00178 | 482/52 |
| 2008/0015095 A1 * | 1/2008 | Savsek | A63B 21/0455 | 482/121 |
| 2009/0176631 A1 * | 7/2009 | Blessing | A63B 22/0061 | 482/71 |
| 2011/0166002 A1 * | 7/2011 | Savsek | A63B 21/0455 | 482/121 |
| 2017/0182345 A1 * | 6/2017 | Wu | A63B 21/4034 | |

* cited by examiner

MULTI-AXIAL UNIDIRECTIONAL POWER TRANSMISSION SYSTEM

BACKGROUND

Field of the Invention

The present invention relates to a power transmission system suitable for use in combination with fitness equipment, and more particularly to a multi-axial unidirectional power transmission system.

Related Prior Art

General exercise equipments provide a variety of exercise simulators which are used to simulate the muscle groups that are needed for various exercises, and then allow the user to exercise specific muscle groups through the exercise simulators. Among them, there is a device that is specifically designed for the simulation of skiing, which mainly consists of two ski pole rails, two ski poles and a damping device. The two ski pole rails extend along a transverse direction, and are arranged side by side and at a predetermined distance from each other. The two ski pole rails each have a guide groove formed along the transverse direction, so that the two ski poles can be inserted in the guide grooves and slide along the transverse direction. The damping device pulls the two ski poles by two belts, respectively, and can produce resistance, so that, with the traction of the belts, the user can feel the resistance when the ski rods move along the transverse direction, and then can exercise the muscle groups required for skiing.

A type of skiing simulator is commercially available, as shown in FIG. 1, which is a perspective view of this skiing simulator, and composed of a damping wheel 11 and two pulleys 12 which are connected in series to a main shaft 13. The damping wheel 11 can produce resistance, and the pulleys 12 pull the ski poles 15 through two belts 14. When the user pull the ski poles 15 along the transverse direction, the belts 14 drive the pulleys 12 and consequently drive the main shaft 13, and then the main shaft 13 rotates to provide resistance through the damping wheel 11, thereby making the user feel the resistance when pulling the ski poles 15.

However, the pulleys 12 and the damping wheel 11 of the aforementioned skiing simulator are mounted on the same main shaft 13, and therefore have to be placed on the skiing simulator (as shown in FIG. 1) in a standup fashion, resulting in danger in use. Besides, the damping wheel 11 and the pulleys 12 stand up during transportation, resulting in difficulty in stacking and thus further increasing the transportation cost.

In view of this, it is necessary to provide a multi-axis unidirectional power transmission system to solve the defect in the aforementioned ski simulator that the damping wheel 11 and the pulleys 12 are installed on the same main shaft 13, resulting in the standup position during transportation.

SUMMARY

One objective of the present invention is to solve the defect of the conventional exercise equipments that the damping wheel and the pulleys are placed in a standup manner on the exercise equipments, and thus reducing difficulty in stacking and thus further increasing the transportation cost.

To achieve the objective, a multi-axial unidirectional power transmission system in accordance with one embodiment of the invention comprises:

a body;

a transmission unit including a first main shaft and a transmission wheel, wherein the first main shaft is mounted on the body, the transmission wheel includes a first transmission portion and a second transmission portion arranged along the first main shaft, the first transmission portion is bi-directionally rotatable, the second transmission portion is only unidirectionally rotatable, a traction belt is connected to the first transmission portion and pulled by a user;

a reset unit connected with the first transmission portion to provide kinetic energy for enabling the first transmission portion to return to its original position;

a resistance unit including a second main shaft, wherein the second main shaft is slidably mounted on the body; and a resistance belt winding around and driving the second transmission portion and the second main shaft; and adjusting a position of the second main shaft on the body can adjust tension of the resistance belt.

Preferably, the resistance unit includes a damping wheel fixed to the second main shaft, the damping wheel is provided with a first magnetoresistive portion, an adjustment unit includes an operating lever, one end of the operating lever is pivotally connected to the body, and another end of the operating lever is provided with a second magnetoresistive portion, pivoting motion of the operating lever makes the second magnetoresistive portion move towards to or away from the first magnetoresistive portion.

A multi-axial unidirectional power transmission system in accordance with another embodiment of the invention comprises:

a body with a first pivot portion and a second pivot portion;

a transmission unit including a first main shaft and a transmission wheel, wherein the first main shaft is mounted on the first pivot portion, the transmission wheel is mounted on the first main shafts, the first main shaft has an axial direction, the transmission wheel includes a first transmission portion and a second transmission portion arranged in the axial direction, the first transmission portion is mounted on the first main shaft by a one-way bearing, a traction belt is connected to the first transmission portion;

a reset unit including a scroll spring disposed at one side of the transmission wheel and having two ends fixed to the first transmission portion and the body, respectively;

a resistance unit including a second main shaft and a damping wheel, wherein the second main shaft is fixed to the second pivot portion, the damping wheel is fixed to the second main shaft and provided with a first magnetoresistive portion;

a resistance belt winding around and driving the second transmission portion and the second main shaft; and an adjustment unit including an operating lever, wherein one end of the operating lever is pivotally connected to the body, and another end of the operating lever is provided with a second magnetoresistive portion, pivoting motion of the operating lever makes the second magnetoresistive portion move towards to or away from the first magnetoresistive portion.

Preferably, the body has two first main rods extending in a transverse direction and arranged parallel to each other, so that there is a use distance between the two first main rods, and a second main rod and a third main rod are arranged parallel to each other between the two first main rods, and each have two ends connected to the two first main rods.

Preferably, the first pivot portion includes two clamping walls and a connecting wall, the two clamping walls are located at two sides of one end of the second main rod, so that there is a pivot distance between the two clamping walls, and the connecting wall is in the form of an elongated rod, and has two ends respectively connected to the two clamping walls.

Preferably, a second pivot portion has two adjustment rods and two adjustment plates, each of the two adjustment rods is U-shaped and mounted on the second main rod, the two adjustment rods are located at a distance from each other, the two adjustment plates are disposed between the two adjustment rods and located at mutually corresponding positions, a guide slot is defined in each of the two adjustment plates along the transverse direction, and the second main shaft has two ends fixed in the guide slots of the two adjustment plates, respectively, by a nut.

Preferably, the first main shaft has two ends disposed on the two clamping walls and is able to rotate on the two clamping walls.

Preferably, the reset unit further includes a housing, the housing covers one side of the transmission wheel to define a reset space between the housing and the transmission wheel, and is fixed to one of the clamping walls, so that the housing does not rotate with the first main shaft, and the scroll spring is installed in the reset space and attached to one side of the transmission wheel, in such a manner that two ends of the scroll spring are fixed to the transmission wheel and the housing, respectively.

Preferably, the adjustment unit further includes an adjustment block, an extension direction of the operating lever is a reference direction, the operating lever is provided with an adjustment rail which has an extension direction defining an angle with respect to the reference direction, the adjustment block is slidably mounted on the third main rod and provided with an insertion pin to be inserted in the adjustment rail, by sliding the adjustment block along the third main rod, the operating lever is pivoted along the adjustment rail, thereby making the second magnetoresistive portion move towards to or away from the first magnetoresistive portion.

The two transmission wheels and the damping wheel can be placed flat on the body since they are mounted on different main shafts, thereby making the whole plane of the multi-axis unidirectional power transmission system of the invention consistent, thus achieving the effects of space saving, convenient storage and convenient transportation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
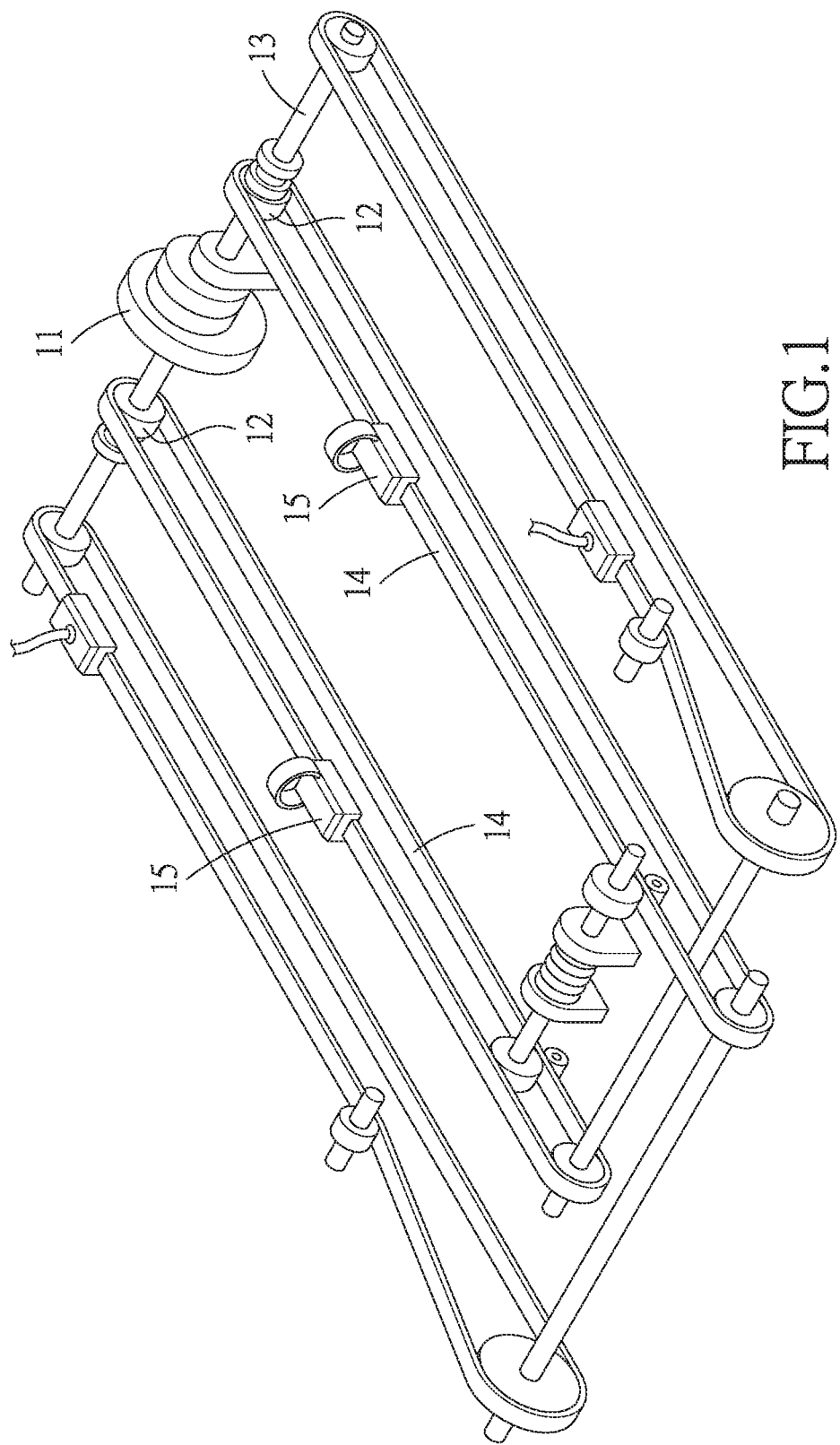
FIG. 1 is a perspective view of a conventional power transmission system.

The present invention will be clearer from the following description when viewed together with the accompanying drawings, which show, for purpose of illustrations only, the preferred embodiment in accordance with the present invention.

Referring to FIGS. 2-6, a multi-axial unidirectional power transmission system in accordance with the invention comprises: a body 20, two transmission unit 30, two reset units 40, a resistance unit 50, a resistance belt 60 and an adjustment unit 70.

The body 20 has two first main rods 21 extending in a transverse direction X and arranged parallel to each other, so that there is a use distance between the two first main rods 21. A second main rod 22 and a third main rod 23 are arranged parallel to each other between the two first main rods 21, and each have two ends connected to the two first main rods 21. The body 20 includes two first pivot portions 24 and a second pivot portion 25. Each of the two first pivot portions 24 includes two clamping walls 241 and a connecting wall 242. The two clamping walls 241 of one of the first pivot portions 24 are respectively located at two sides of one end of the second main rod 22, and the two clamping walls 241 of another of the first pivot portions 24 are respectively located at two sides of another end of the second main rod 22, so that there is a pivot distance between the two clamping walls 241 of each of the two first pivot portions 24. The connecting wall 242 is in the form of a long rod, and have two ends respectively connected to the two clamping walls 241 for stabilizing the two clamping walls 241. The second pivot portion 25 has two adjustment rods 251 and two adjustment plates 252. Each of the two adjustment rods 251 is generally U-shaped and mounted on the second main rod 22. The two adjustment rods 251 are located at a distance from each other. The two adjustment plates 252 are disposed between the two adjustment rods 251 and located at mutually corresponding positions. A guide slot 2521 is defined in each of the two adjustment plates 252 along the transverse direction X.

The two transmission units 30 each have a first main shaft 31 and a transmission wheel 32. The first main shafts 31 each have two ends disposed on the two clamping walls 241, so that the first main shafts 31 are able to rotate circumferentially on the two clamping walls 241. Each of the transmission wheels 32 is mounted on a corresponding one of the first main shafts 31. Each of the first main shafts 31 has an axial direction Y which is perpendicular to the transverse direction X, and each of the transmission wheels 32 includes a first transmission portion 321 and a second transmission portion 322 arranged in the axial direction Y. A traction belt 90 has one end connected to and wound around the first transmission portion 321 of each of the transmission wheels 32. The first transmission portion 321 is bi-directionally rotatable, and the second transmission portion 322 is only unidirectionally rotatable. In this embodiment, each of the first transmission portions 321 is mounted on a corresponding one of the first main shafts 31 by a one-way bearing, which makes the first main shaft 31 only rotatable in one direction, and then also makes the second transmission portion 322 rotatable in one direction only.

The two reset units 40 each include a scroll spring 41. The scroll spring 41 has one end fixed to the first transmission portion 321 and another end fixed to the body 20, respectively (for easy explanation, only one reset unit 40 is described here). In this embodiment, the two reset units 40 each further include a housing 42 which covers one side of a corresponding one of the transmission wheels 32 to define a reset space between the housing 42 and the transmission wheel 32, and is fixed to one of the clamping walls 241, so that the housing 42 does not rotate with the scroll spring 41. The scroll spring 41 is installed in the reset space and attached to one side of the transmission wheel 32, in such a manner that the scroll spring 41 has another end fixed to the housing 42.

The resistance unit 50 includes a second main shaft 51 and a damping wheel 52. The second main shaft 51 has two ends fixed in the guide slots 2521 of the two adjustment plates 252, respectively, by a nut 53, so as to fix the second main shaft 51. Since the guide slots 2521 extend along the transverse direction X, the second main shaft 51 is capable of moving along the transverse direction X within the guide slots 2521. The damping wheel 52 is rotatably mounted on the second main shaft 51 and provided with a first magnetoresistive portion 54.

The resistance belt 60 winds around and drives the two second transmission portions 322 and the second main shaft 51.

The adjustment unit 70 is mounted on the third main shaft 23 and includes an operating lever 71 and an adjustment block 72. One end of the operating lever 71 is pivotally connected to the third main rod 23, and the other end is provided with a second magnetoresistive portion 73. The extension direction of the operating lever 71 is a reference direction L1. The operating lever 71 is provided with an adjustment rail 711 which has an extension direction L2 defining an angle θ with respect to the reference direction L1. The adjustment block 72 is slidably mounted on the third main rod 23 and provided with an insertion pin 721 to be inserted in the adjustment rail 711. By sliding the adjustment block 72 along the third main rod 23, the operating lever 71 can be pivoted along the adjustment rail 711, so that the second magnetoresistive portion 73 is caused to move towards to or away from the first magnetoresistive portion 54. In another embodiment, the adjustment unit 70 further includes an auxiliary rod 74, and the adjustment block 72 is slidably mounted on the auxiliary rod 74.

Figure 2:
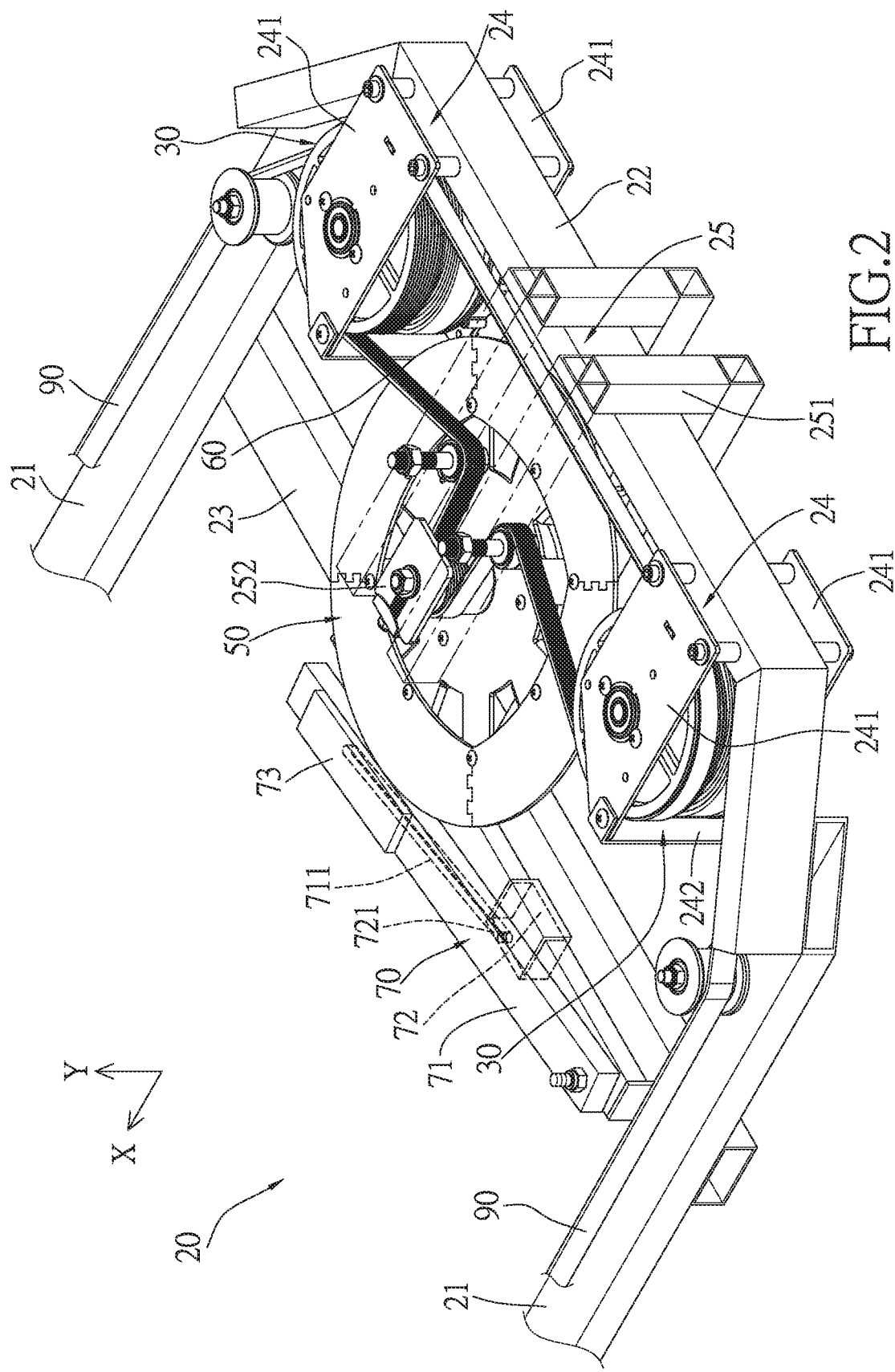
FIG. 2 is a perspective view of a multi-axial unidirectional power transmission system in accordance with a preferred embodiment of the invention.
Figure 3:
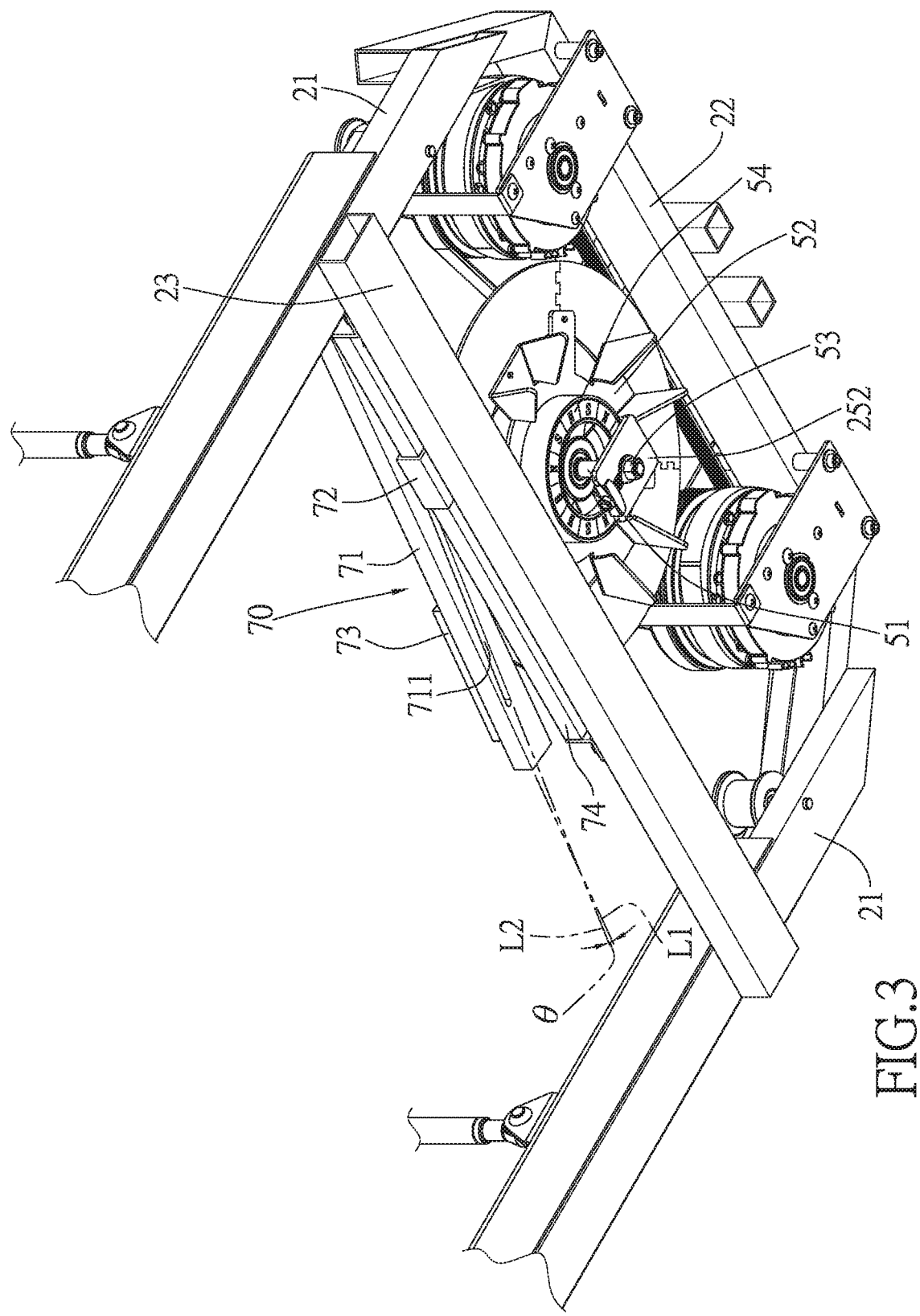
FIG. 3 is a perspective view of the multi-axial unidirectional power transmission system in accordance with a preferred embodiment of the invention.
Figure 4:
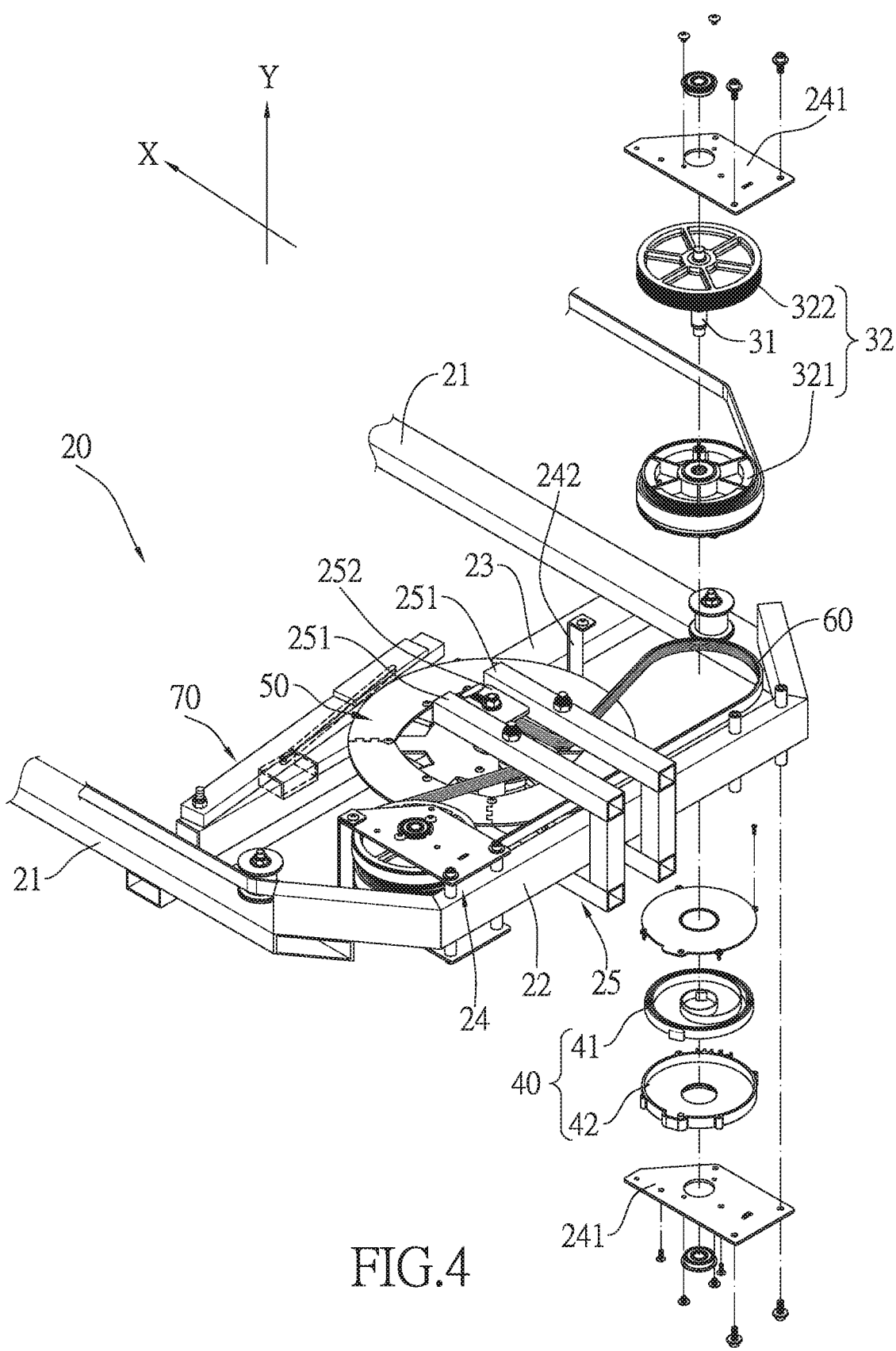
FIG. 4 is an exploded view of the transmission unit and the reset unit of the multi-axial unidirectional power transmission system in accordance with the preferred embodiment of the invention.

What mentioned above are the structural configurations of the present invention and their connection relations, and the use of the present invention is described as follows:

Referring to FIG. 2, the user pulls the two traction belts 90 to drive the two first transmission portions 321 to rotate, the rotation of the first transmission portions 321 causes the scroll springs 41 to curl up, meanwhile, the first transmission portions 321 rotate the second transmission portions 322 and pulls the resistance belt 60 to rotate the damping wheel 52 of the resistance unit 50, and then the rotation of the damping wheel 52 drives the first magnetoresistive portion 54, so as to produce magnetic force between the first magnetoresistive portion 54 and the adjustment unit 70, making the damping wheel 52 produce resistance, so that the user has to pull the traction belts 90 with relatively greater force.

When the user releases the traction belts 90, the scroll springs 41 bounce back to make the two first transmission portions 321 to rotate reversely, and when the first transmission portions 321 rotate reversely, the two second transmission portions 322 won't rotate because of the one-way bearing, and the first transmission portions 321 will roll up the traction belts 90.

Figure 5:
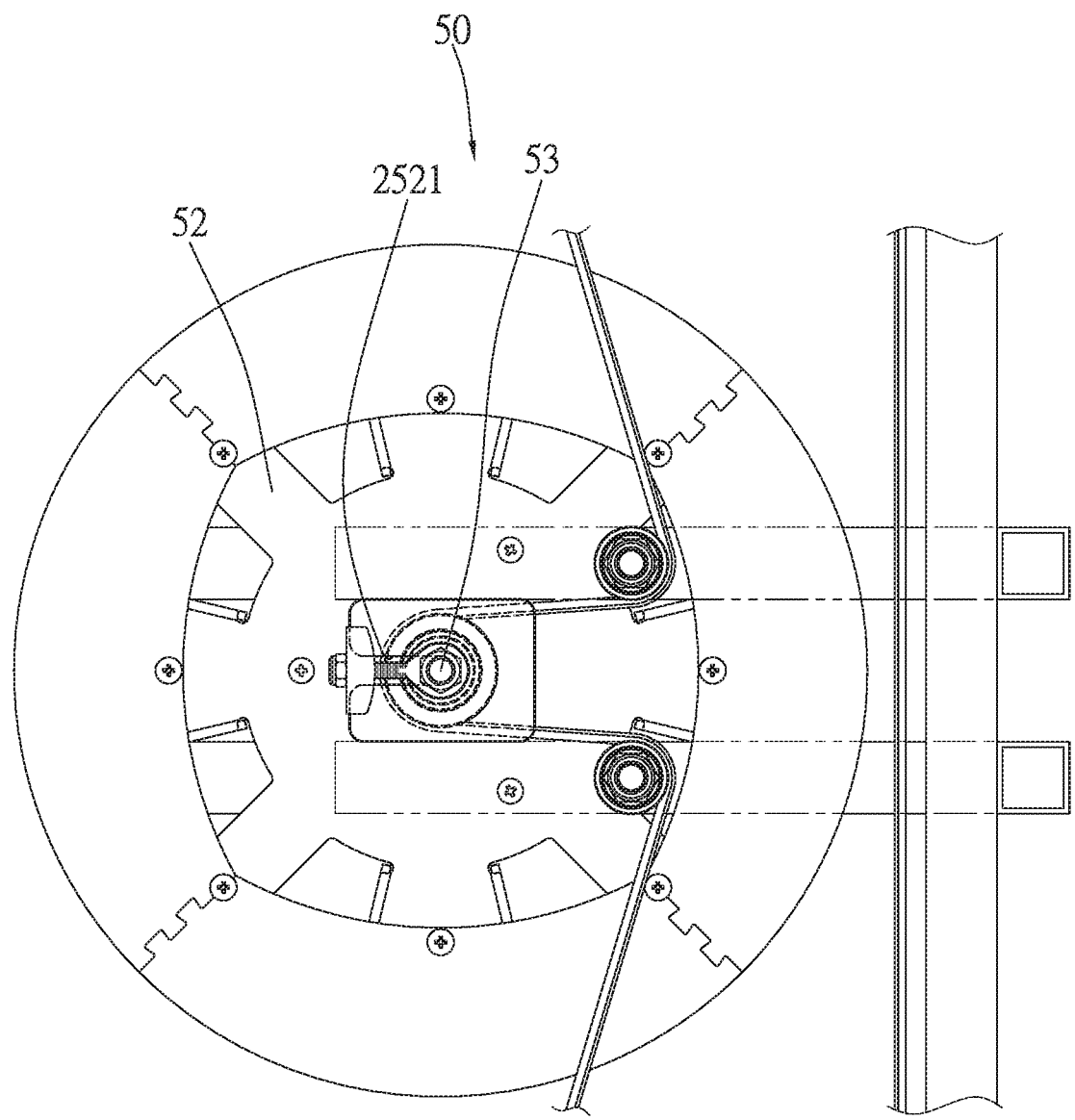
FIG. 5 is a perspective view of the preferred embodiment of the invention, showing that the resistance unit is in a first position.
Figure 6:
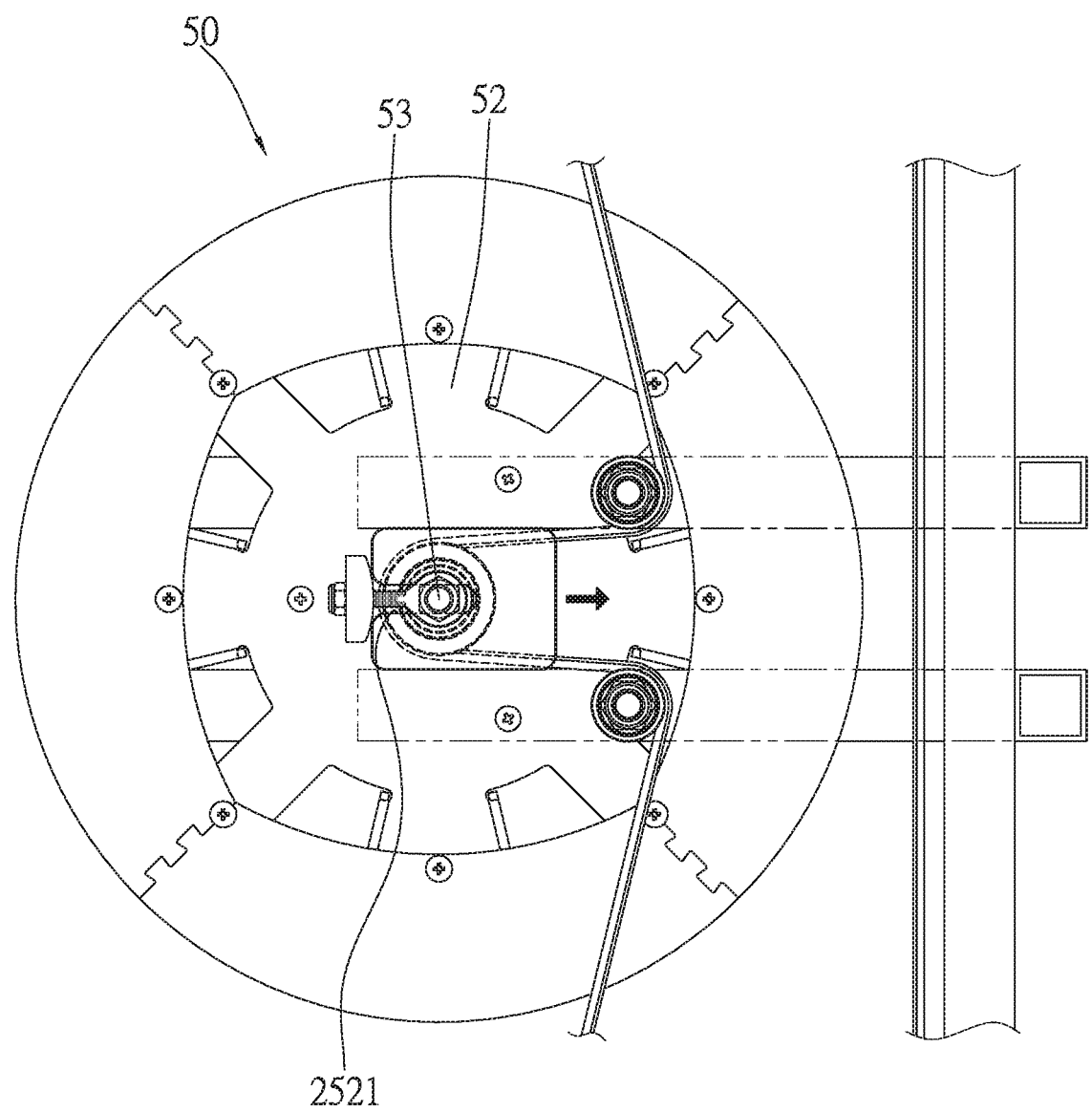
FIG. 6 is a perspective view of the preferred embodiment of the invention, showing that the resistance unit is in a second position.

Referring then to FIGS. 5 and 6, when the user wants to adjust the resistance, the nuts 53 can be loosened firstly to allow the second main shaft 51 to be moved along the transverse direction X within the guide slots 2521, so that the user can move the second main shaft 51 along the transverse direction X toward the adjustment unit 70 so as to tension the resistance belt 60. After that, the user can fix the second main shaft 51 again by screwing tight the nuts 53, so that the user has to pull the traction belts 90 with relatively greater force when the resistance belt 60 is tensioned.

Figure 7:
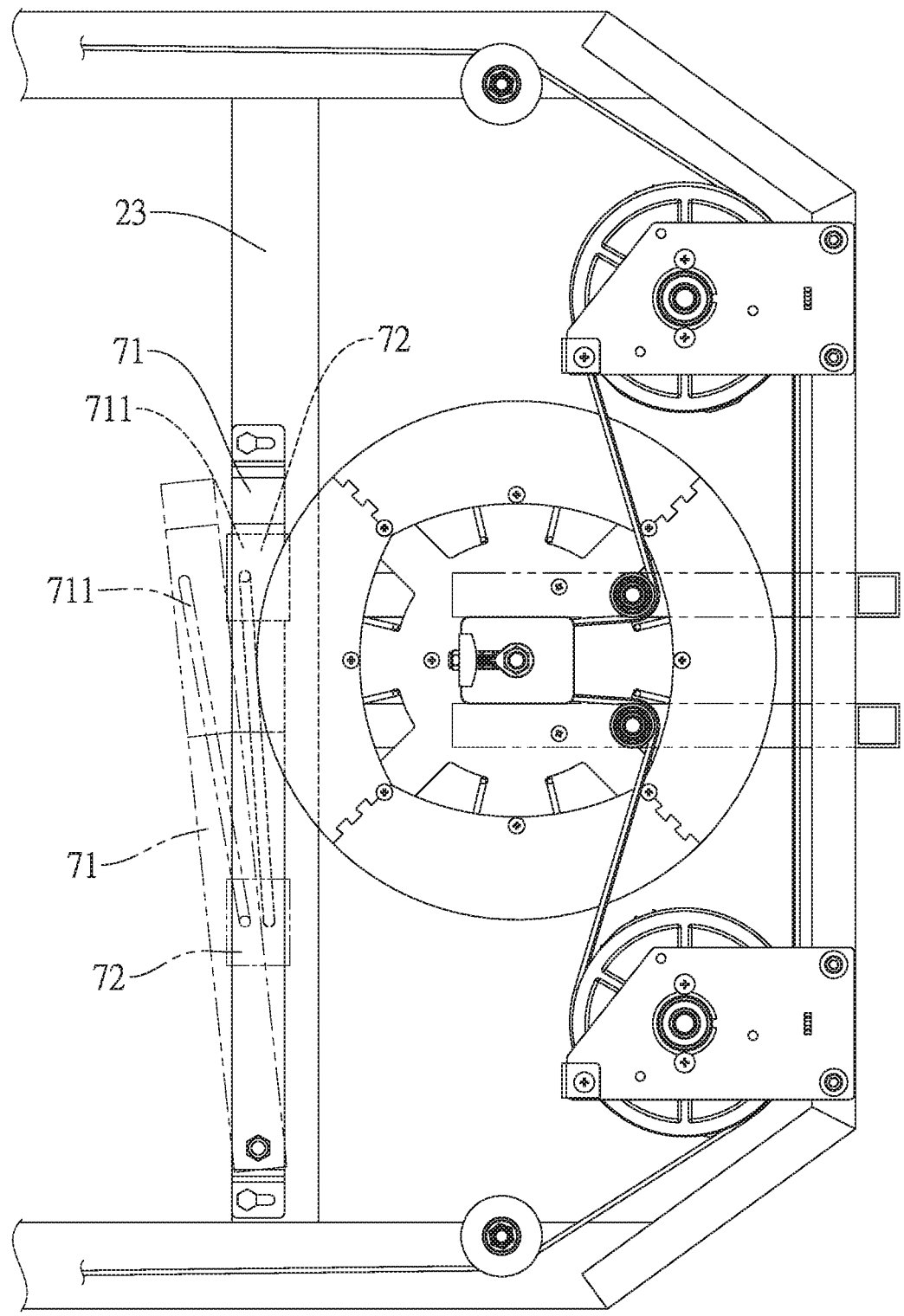
FIG. 7 is an illustrative view showing the adjustment unit of a preferred embodiment of the invention.

Referring to FIG. 7, when the user wants to adjust the resistance, he/she can also move the adjustment block 72 along the third main shaft 23. The insertion pin 721 moves within the adjustment rail 711 of the adjustment block 72 to make the operating lever 71 pivot, so that the second magnetoresistive portion 73 is caused to move towards to or away from the first magnetoresistive portion 54. In this way, the user can adjust the resistance as desired.

The two transmission wheels 32 and the damping wheel 52 can be placed flat on the body 20 since they are mounted on different main shafts, thereby making the whole plane of the multi-axis unidirectional power transmission system of the invention consistent, thus achieving the effects of space saving, convenient storage and convenient transportation.

While we have shown and described various embodiments in accordance with the present invention, it is clear to those skilled in the art that further embodiments may be made without departing from the scope of the present invention.

What is claimed is:

1. A multi-axial unidirectional power transmission system, comprising:
   a body;
   a transmission unit including a first main shaft and a transmission wheel, wherein the first main shaft is mounted on the body, the transmission wheel includes a first transmission portion and a second transmission portion arranged along the first main shaft, the first transmission portion is bi-directionally rotatable, the second transmission portion is only unidirectionally rotatable, a traction belt is connected to the first transmission portion and configured to be pulled by a user;
   a reset unit connected with the first transmission portion to provide kinetic energy for enabling the first transmission portion to return to its original position;
   a resistance unit including a second main shaft, wherein the second main shaft is slidably mounted on the body; and
   a resistance belt winding around and driving the second transmission portion and the second main shaft; and
   wherein adjusting a position of the second main shaft on the body can adjust tension of the resistance belt.

2. The multi-axial unidirectional power transmission system as claimed in claim 1, wherein the resistance unit includes a damping wheel fixed to the second main shaft, the damping wheel is provided with a first magnetoresistive portion, an adjustment unit includes an operating lever, one end of the operating lever is pivotally connected to the body, and another end of the operating lever is provided with a second magnetoresistive portion, wherein pivoting motion of the operating lever makes the second magnetoresistive portion move towards or away from the first magnetoresistive portion.

3. A multi-axial unidirectional power transmission system, comprising:
a body with a first pivot portion and a second pivot portion;
a transmission unit including a first main shaft and a transmission wheel, wherein the first main shaft is mounted on the first pivot portion, the transmission wheel is mounted on the first main shaft, the first main shaft has an axial direction, the transmission wheel includes a first transmission portion and a second transmission portion arranged in the axial direction, the first transmission portion is mounted on the first main shaft by a one-way bearing, a traction belt is connected to the first transmission portion;
a reset unit including a scroll spring disposed at one side of the transmission wheel and having two ends fixed to the first transmission portion and the body, respectively;
a resistance unit including a second main shaft and a damping wheel, wherein the second main shaft is fixed to the second pivot portion, the damping wheel is fixed to the second main shaft and provided with a first magnetoresistive portion;
a resistance belt winding around and driving the second transmission portion and the second main shaft; and
an adjustment unit including an operating lever, wherein one end of the operating lever is pivotally connected to the body, and another end of the operating lever is provided with a second magnetoresistive portion, wherein pivoting motion of the operating lever makes the second magnetoresistive portion move towards or away from the first magnetoresistive portion.

4. The multi-axial unidirectional power transmission system as claimed in claim 3, wherein the body has two first main rods extending in a transverse direction and arranged parallel to each other, so that there is a use distance between the two first main rods, and a second main rod and a third main rod are arranged parallel to each other between the two first main rods, and the second main rod and the third main rod each have two ends connected to the two first main rods.

5. The multi-axial unidirectional power transmission system as claimed in claim 3, wherein the body has two first main rods extending in a transverse direction and arranged parallel to each other, so that there is a use distance between the two first main rods, a second main rod and a third main rod are arranged parallel to each other between the two first main rods, and the second main rod and the third main rod each have two ends connected to the two first main rods, the second pivot portion has two adjustment rods and two adjustment plates, each of the two adjustment rods is U-shaped and mounted on the second main rod, the two adjustment rods are located at a distance from each other, the two adjustment plates are disposed between the two adjustment rods and located at mutually corresponding positions, a guide slot is defined in each of the two adjustment plates along the transverse direction, and the second main shaft has two ends fixed in the guide slots of the two adjustment plates, respectively, by a nut.

6. The multi-axial unidirectional power transmission system as claimed in claim 3, wherein the body has two first main rods extending in a transverse direction and arranged parallel to each other, so that there is a use distance between the two first main rods, and a second main rod and a third main rod are arranged parallel to each other between the two first main rods, the second main rod and the third main rod each have two ends connected to the two first main rods, the first pivot portion includes two clamping walls and a connecting wall, the two clamping walls are located at two sides of one end of the second main rod, so that there is a pivot distance between the two clamping walls, and the connecting wall is in the form of an elongated rod, and has two ends respectively connected to the two clamping walls.

7. The multi-axial unidirectional power transmission system as claimed in claim 3, wherein the body has two first main rods extending in a transverse direction and arranged parallel to each other, so that there is a use distance between the two first main rods, and a second main rod and a third main rod are arranged parallel to each other between the two first main rods, the second main rod and the third main rod each have two ends connected to the two first main rods, the first pivot portion includes two clamping walls and a connecting wall, the two clamping walls are located at two sides of one end of the second main rod, so that there is a pivot distance between the two clamping walls, the connecting wall is in the form of an elongated rod and has two ends respectively connected to the two clamping walls, and the first main shaft has two ends disposed on the two clamping walls and is able to rotate on the two clamping walls.

8. The multi-axial unidirectional power transmission system as claimed in claim 3, wherein the first pivot portion includes two clamping walls and a connecting wall, the two clamping walls are located at two sides of the body, so that there is a pivot distance between the two clamping walls, the connecting wall is in the form of an elongated rod and has two ends respectively connected to the two clamping walls, the reset unit further includes a housing, the housing covers one side of the transmission wheel to define a reset space between the housing and the transmission wheel, and is fixed to one of the clamping walls, so that the housing does not rotate with the scroll spring, and the scroll spring is installed in the reset space and attached to one side of the transmission wheel, in such a manner that two ends of the scroll spring are fixed to the first transmission portion and the housing, respectively.

9. The multi-axial unidirectional power transmission system as claimed in claim 3, wherein the body has two first main rods extending in a transverse direction and arranged parallel to each other, so that there is a use distance between the two first main rods, a second main rod and a third main rod are arranged parallel to each other between the two first main rods, the second main rod and the third main rod each have two ends connected to the two first main rods, the adjustment unit further includes an adjustment block, an extension direction of the operating lever is a reference direction, the operating lever is provided with an adjustment rail which has an extension direction defining an angle with respect to the reference direction, the adjustment block is slidably mounted on the third main rod and provided with an insertion pin to be inserted in the adjustment rail, by sliding the adjustment block along the third main rod, the operating lever is pivotable along the adjustment rail, thereby making the second magnetoresistive portion move towards or away from the first magnetoresistive portion.

10. The multi-axial unidirectional power transmission system as claimed in claim 3, wherein the adjustment unit further includes an adjustment block and an auxiliary rod, an extension direction of the operating lever is a reference direction, the operating lever is provided with an adjustment rail which has an extension direction defining an angle with respect to the reference direction, the adjustment block is slidably mounted on the auxiliary rod and provided with an insertion pin to be inserted in the adjustment rail, by sliding the adjustment block along the auxiliary rod, the operating lever is pivotable along the adjustment rail, thereby making the second magnetoresistive portion move towards or away from the first magnetoresistive portion.

* * * * *